(12) United States Patent
Bates

(10) Patent No.: US 6,341,931 B1
(45) Date of Patent: Jan. 29, 2002

(54) BARREL HANDLING APPARATUS

(76) Inventor: Byron Bates, 24119 NE. 132 Ave., Battle Ground, WA (US) 98604

( * ) Notice: Subject to any disclaimer, the term of this patent is extended or adjusted under 35 U.S.C. 154(b) by 0 days.

(21) Appl. No.: 09/626,171

(22) Filed: Jul. 27, 2000

(51) Int. Cl.$^7$ .................................................. B65G 1/00
(52) U.S. Cl. ................................ 414/331.04; 211/1.55; 211/164
(58) Field of Search ........................... 414/331.04, 247, 414/248, 250, 251; 198/797; 211/1.51, 1.55, 164; 312/267, 268

(56) References Cited

U.S. PATENT DOCUMENTS

| 592,203 A | * | 10/1897 | Martin | |
|---|---|---|---|---|
| 1,935,891 A | | 11/1933 | Schroeder | 198/25 |
| 4,619,475 A | | 10/1986 | Sylvest, II | 294/90 |
| 4,674,602 A | | 6/1987 | Smith et al. | 187/16 |
| 4,932,536 A | * | 6/1990 | Schlunke et al. | 211/164 |
| 5,924,580 A | * | 7/1999 | Chase | 211/1.55 |

* cited by examiner

Primary Examiner—Joseph E. Valenza
(74) Attorney, Agent, or Firm—Chernoff, Vilhauer, McClung & Stenzel, LLP

(57) ABSTRACT

The material handling system includes a frame supporting a horizontally extending axle. A rotatable superstructure is rotatably mounted to the axle. The rotatable superstructure is generally circular and includes a plurality of spaced apart horizontal support rod members which are generally parallel to the axle and are arranged about the outer circumference of the rotating superstructure. Engagement clips attached to each of the support rod members are sized and configured so as to grasp the rims of metal storage barrels. The clips extend from points near the central portions of the rods to out past the ends of the barrels. The weight of the barrels forces the clips into snug engagement with the barrel rims. Thus, the barrels are held on a rotating wheel-like structure which may be motor driven to cause the frame to rotate about the horizontal axle.

15 Claims, 4 Drawing Sheets

BARREL HANDLING APPARATUS

BACKGROUND OF THE INVENTION

The following invention relates to a material handling system and, in particular, to a material handling system for handling large industrial drums of material such as steel fifty-five gallon drums.

Many industrial materials such as various chemicals, oils and solvents are stored typically in fifty-five gallon drums. These drums are extremely heavy and their handling is cumbersome and dangerous. Typically, fifty-five gallon drums are stored on palettes. Further, the drums are lifted and transported by the use of forklifts. The barrels frequently have to be carried and hoisted by hand as well, and the weight frequently creates back injuries. It is also difficult to maneuver the barrels from the floor where they are usually upright (so that they do not roll) to the pallets where they must be placed on their sides in stacks. Usually, there is some sort of fork lift or jack that is used to lift the barrels but often they must be tipped over by hand to be stored on the pallets.

Various types of apparatus have been proposed for handling industrial materials stored in drums or barrels. An example of such an apparatus is shown in Schroeder, U.S. Pat. No. 1,935,891. The Schroeder system is a barrel tipping apparatus and, as such, retains many of the disadvantages of the methods discussed above because it is configured to handle the barrels end-up. The object of the Schroeder device is to transfer barrels which may be found in a horizontal rolling axis position to an end-up position. A drum lifting apparatus is shown in Sylvest, U.S. Pat. No. 4,619,475.

BRIEF SUMMARY OF THE INVENTION

The present invention provides a material handling system that overcomes the problems inherent in prior art systems and enables a user to store and maintain heavy drums or barrels of material in a safe and economical manner. The material handling system includes a frame supporting a horizontally extending axle. A rotatable superstructure is rotatably mounted to the axle. The rotatable superstructure is generally circular and includes a plurality of spaced apart horizontal support rod members which are generally parallel to the axle and are arranged about the outer circumference of the rotating superstructure. Engagement clips attached to each of the support rod members are sized and configured so as to grasp the rims of metal storage barrels. The clips extend from points near the central portions of the rods to out past the ends of the barrels. The weight of the barrels forces the clips into snug engagement with the barrel rims. Thus, the barrels are held on a rotating wheel-like structure which may be motor driven to cause the frame to rotate about the horizontal axle.

A flat-bed lift apparatus supported by casters or wheels holds barrels which are laid in a horizontally axially extending configuration. The barrels may then be lifted by a hydraulic jack attached to the flat bed for easy engagement by the engagement clips. Lowering the jack will leave the barrels suspended from the clips, and the wheel may then be rotated so that the next barrel may be either removed or attached to the storage wheel. The engagement clips may be metal pieces or heads which are swaged onto the end of a steel cable. The cable may be threaded through portions of the horizontal support rods to exit at apertures so that the cables extend outwardly from the central portions of the support rods. In this way, when the clips engage the rims of the steel barrels friction imparted by the heavy weight of the barrels holds the rims of the barrels securely onto the clips.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
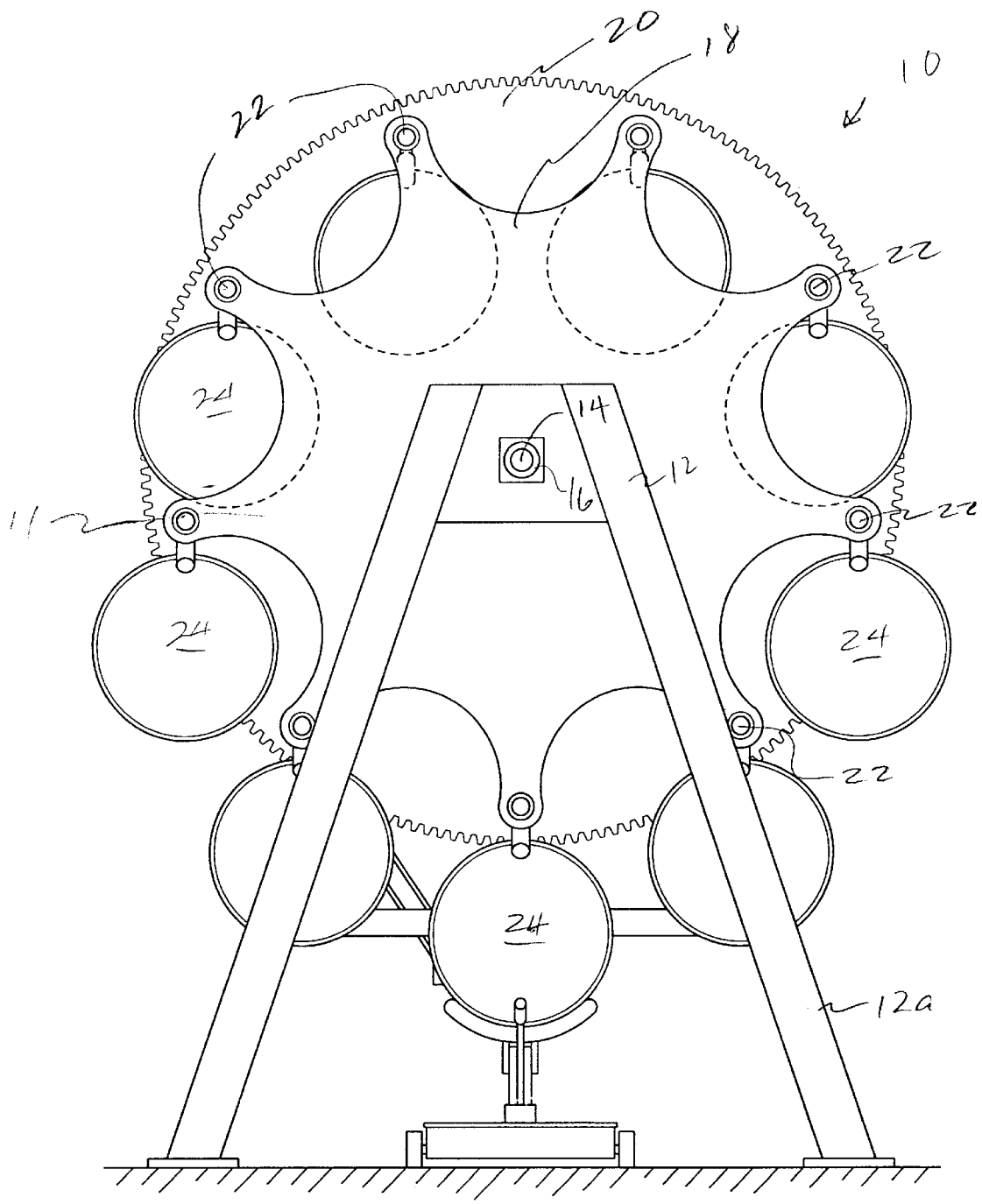
FIG. 1 is a front view of the barrel handling apparatus of the present invention.
Figure 2:
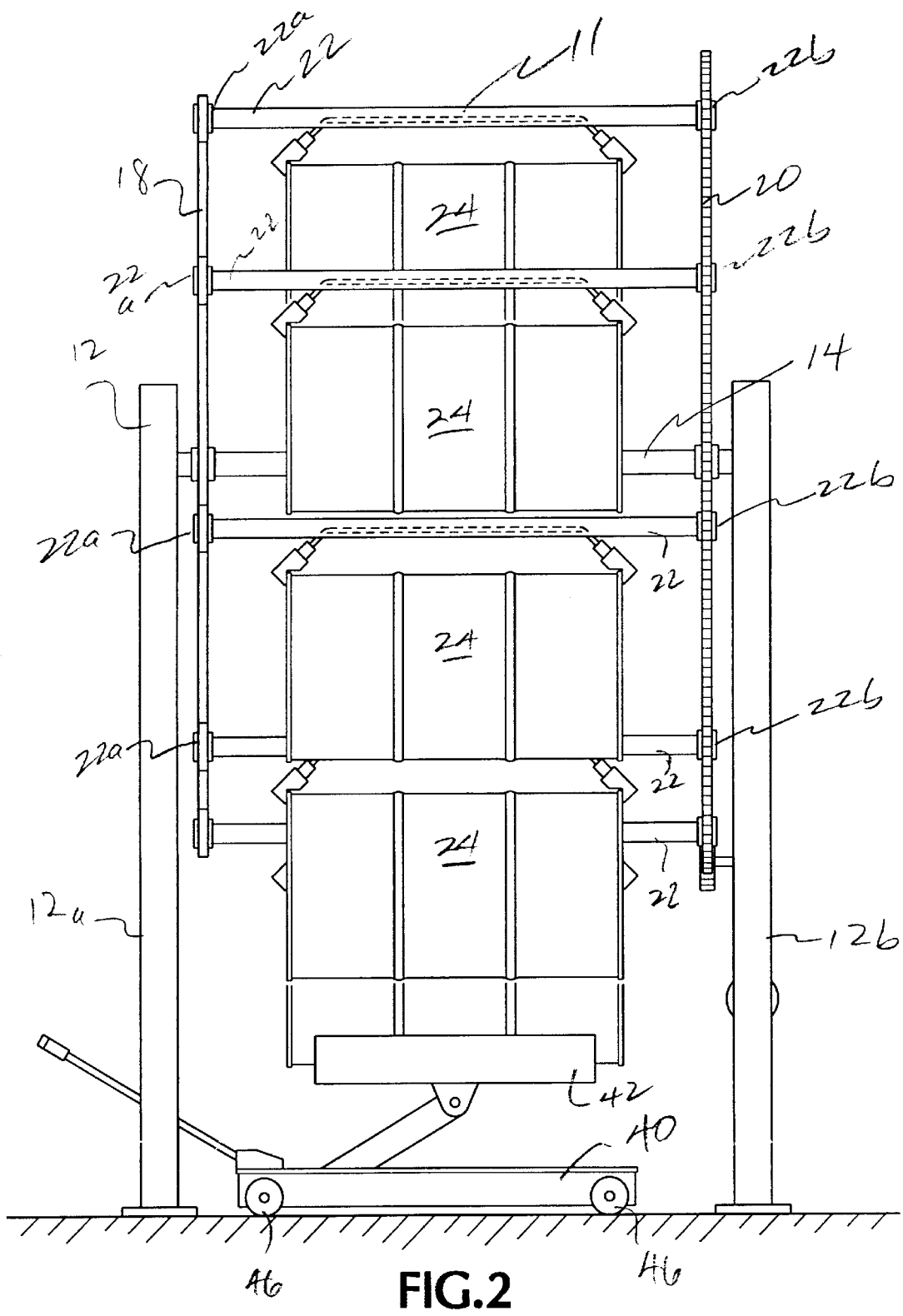
FIG. 2 is a side view of the apparatus of FIG. 1.
Figure 3:
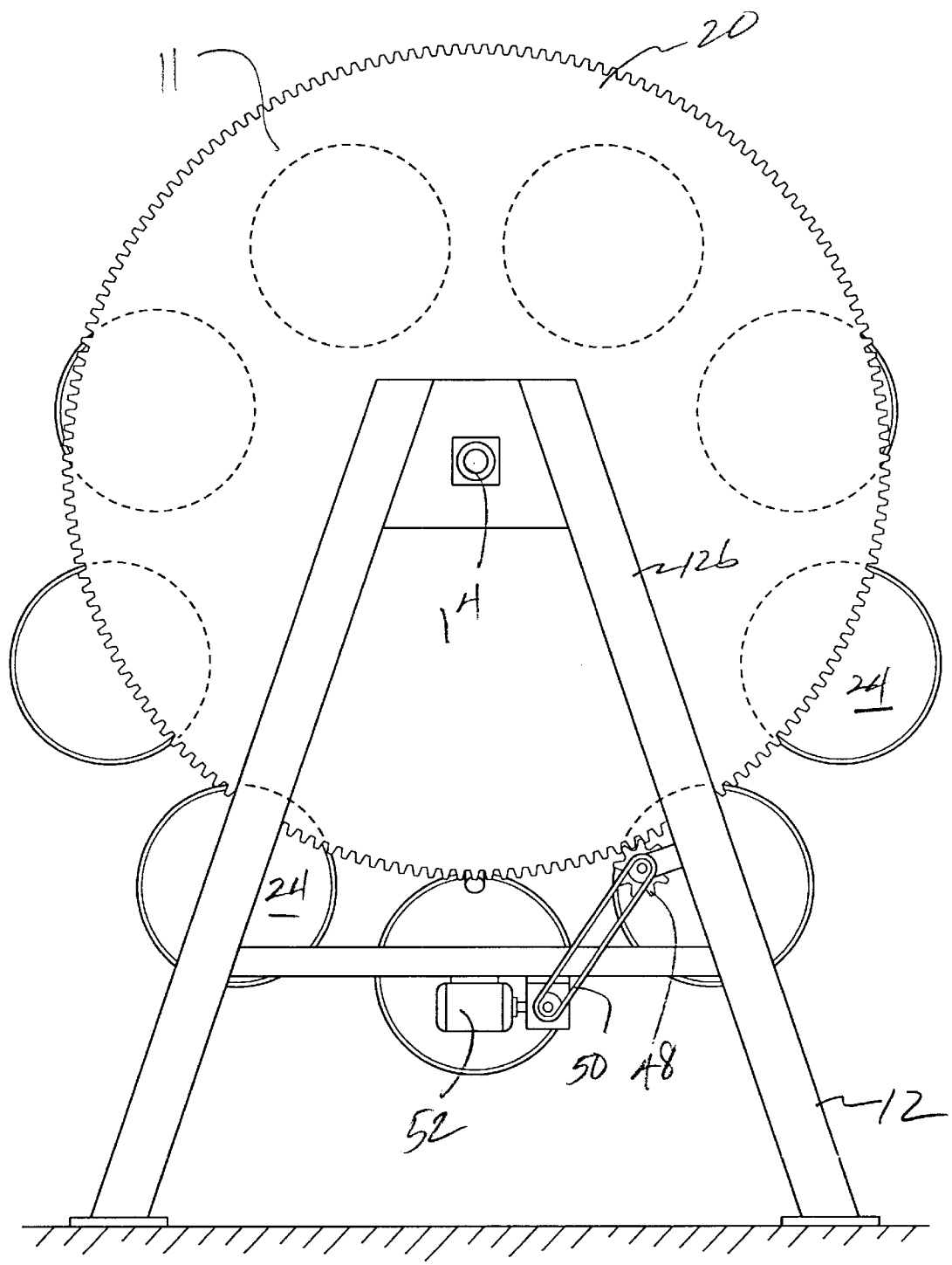
FIG. 3 is a rear view of the apparatus of FIG. 1.

Referring to FIG. 1, a barrel handling apparatus 10 includes a frame 12 comprising frame members 12A and 12B. An axle 14 is journalled through an aperture 16 in the frame 12. A rotating wheel member 18 adjacent frame member 12A rotates about the axle 14. Adjacent frame member 12B a toothed wheel member 20 is supported by and rotates about the axle 14. The wheel members 18 and 20 are joined together by a plurality of horizontal support rods 22 so that the two wheel members 18 and 20 lie in spaced apart parallel planes. The rods are freely rotatable in sleeves 22A and 22B. This forms a rotatable superstructure 11 suspended on the frame 12.

Figure 4:
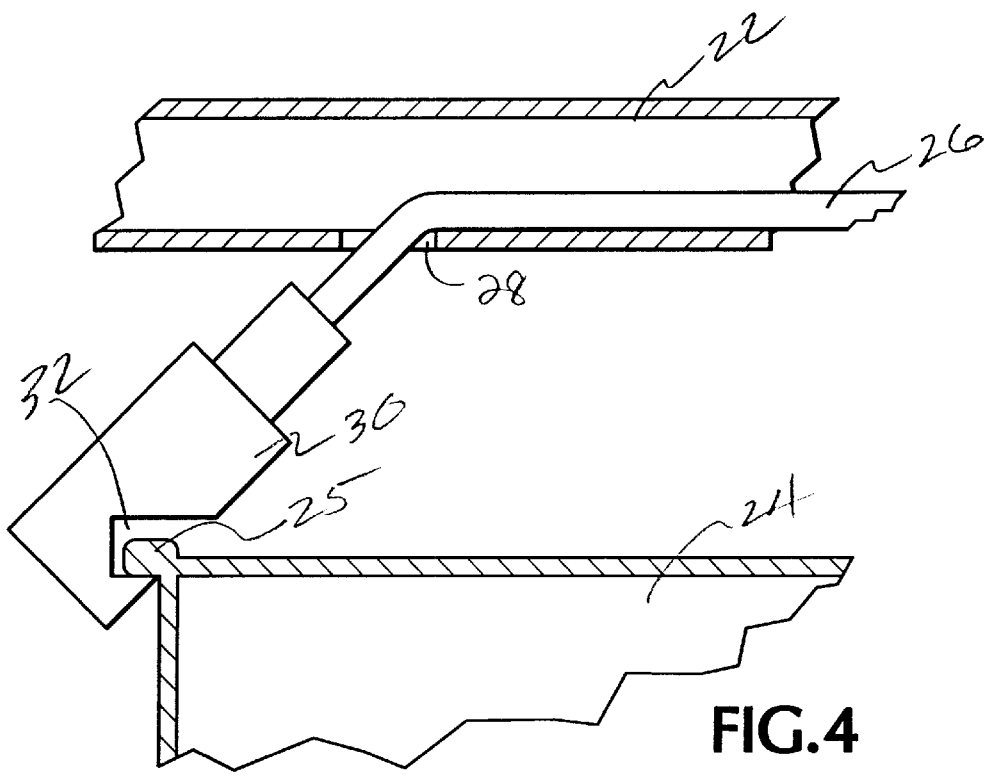
FIG. 4 is a side cutaway view of a cable and retainer hooked to the end of a barrel.

A plurality of barrels 24, such as standard sized fifty-five gallon drums, may be loaded on and stored on the apparatus 10. Referring to FIG. 4, each support rod 22 is hollow and a steel cable 26 extends through each and exits the inside of each rod 22 through apertures 28. The apertures 28 are positioned so that the cables 26 flare outwardly at an angle to the vertical post the ends of the barrels. Each cable 26 includes a swaged clip 30 which has a notch 32 cut into it. Each of the barrels 24 has a rim portion 25. The notch portions 32 of the clips 30 are each cut and dimensioned so as to fit over the rim 25 of a barrel 24.

The cables 26 have a length and the apertures 28 are cut relative to the length of the barrels such that the cables 26 extend out at an angle relative to the central portions of the support rods 22. When the clips engage the rims 25 of the barrels 24, the natural weight of the barrels forces the clips 30 into engagement with the rims 25. Thus the cable and clip arrangement acts as a hanger for the barrels where the hangers are freely moveable.

Figure 5:
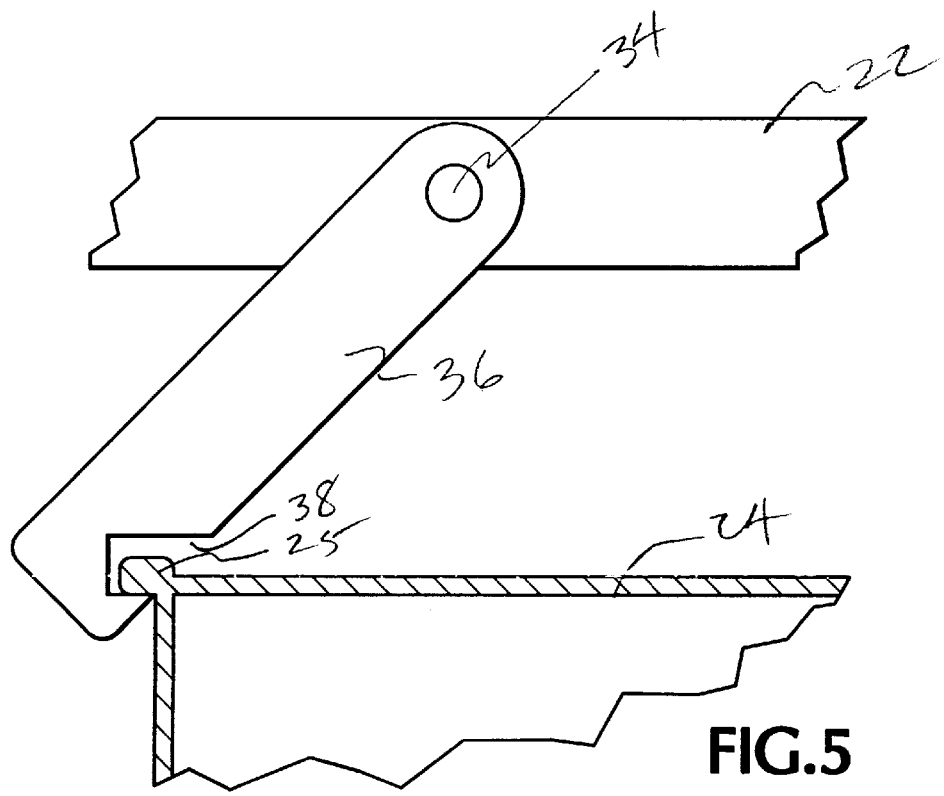
FIG. 5 is an alternative to the structure of FIG. 4 showing a pivotable link retainer hooked to a barrel.

An alternative arrangement is shown in FIG. 5. According to this embodiment the support rods 22 are drilled through with pins 34 which support pivotable links 36. The pivotable links 36 include notches 38 that engage the rims 25 of the barrels 24. Like the cables 26, the links 36 flare outwardly from a central portion of the rods 22 and form an angle with respect to vertical.

The barrels 24 are loaded onto the apparatus 10 by a jack 40. The jack 40 has a pallet 42 configured to hold a barrel 24. The jack 40 is supported on wheels 46 or casters and may thus be loaded with a barrel and then positioned at the bottom of the superstructure 11. The barrel can then be raised into position and the clips engaged. When the jack 40 is lowered, the weight of the barrel forces the clips into tight engagement with the rim. The superstructure 11 may then be rotated so that another barrel may be loaded or unloaded.

The wheel member 20 is toothed and is driven by a gear 48. The gear 48 is turned by a belt 50 which is driven by a motor 52. The motor is controlled by conventional means. Other types of drive schemes may be used to rotate the superstructure 11 and other mechanical methods of doing so will be apparent to those skilled in the art.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A material handling system comprising:
   (a) a frame supporting a horizontally extending axle;
   (b) a rotatable superstructure having an outer circumference and rotatably mounted to the axle, the superstructure including a plurality of spaced-apart horizontal support members substantially parallel to the axle and arranged generally about the outer circumference of the rotating superstructure;
   (c) a pair of engagement clips attached to each of the horizontal members, the engagement clips being sized and configured so as to grasp the rims of storage barrels.

2. The material handling system of claim 1 further including a motor coupled to the frame for causing rotation of the superstructure about the axle.

3. The material handling system of claim 1 wherein the engagement clips are affixed to cables supported by the horizontal support members.

4. The material handling system of claim 3 wherein the cables extend downwardly and outwardly from a horizontal center of the horizontal support members at an angle whereby the clips frictionally engage the rims of the barrels.

5. The material handling system of claim 3 wherein the engagement clips are affixed to cables threaded through portions of the horizontal members.

6. The material handling system of claim 3 wherein the engagement clips are head members having an angle notch.

7. The material handling system of claim 1 wherein the superstructure comprises a pair of parallel wheel members rotatable about the axle and said horizontal support members extending between the pair of wheel members.

8. The material handling system of claim 1 wherein the horizontal support members are bars arranged substantially evenly about the outer circumference of each of the wheel members.

9. The material handling system of claim 8 wherein the engagement clips are affixed to freely moveable hangers supported by the bars.

10. The material handling system of claim 9 wherein the hangers extend downwardly and outwardly from near a horizontal central portion of the horizontal members at an angle whereby the clips frictionally engage the rims of the barrels.

11. The material handling system of claim 8 wherein one of the wheel members includes a plurality of teeth at an outer circumference thereof and further including a motor driven gear for engaging the teeth.

12. The material handling system of claim 1 further including a loading jack having a lift mechanism for lifting a barrel to enable it to be secured by a pair of the engagement clips.

13. The material handling system comprising:
   (a) a frame supporting a horizontally extending axle;
   (b) a rotatable superstructure having an outer circumference and rotatably mounted to the support rod, the superstructure including a plurality of spaced-apart horizontal members substantially parallel to the axle and arranged about an outer circumference of the rotating superstructure;
   (c) a plurality of drum-holding assemblies, each assembly comprising a pair of drum lip engagement members depending from the horizontal members.

14. The material handling system of claim 13 wherein the drum-lifting assemblies comprise a cable threaded through a pair of apertures in each of the horizontal members and having drum lip engaging heads affixed at each end of the cables.

15. The material handling system of claim 13 wherein the drum-holding assemblies comprise pairs of pivotable links affixed to each of the horizontal members, each pivotable link having a drum lip engaging notch in an outer end thereof.

\* \* \* \* \*